United States Patent
Angiulli et al.

(10) Patent No.: US 10,145,473 B2
(45) Date of Patent: Dec. 4, 2018

(54) GASKET

(71) Applicant: FREUDENBERG SEALING TECHNOLOGIES S.A.S. DI EXTERNA ITALIA S.R.L.U, Pinerolo (IT)

(72) Inventors: Pasquale Angiulli, Pinerolo (IT); Luca Breusa, Pinerolo (IT); Francesco Vignolo, Pinerolo (IT); Stefano Miletto, Pinerolo (IT); Maurizio Buro, Pinerolo (IT)

(73) Assignee: FREUDENBERG SEALING TECHNOLOGIES S.A.S. DI EXTERNA ITALIA S.R.L.U. (IT)

( * ) Notice: Subject to any disclaimer, the term of this patent is extended or adjusted under 35 U.S.C. 154(b) by 201 days.

(21) Appl. No.: 15/091,936

(22) Filed: Apr. 6, 2016

(65) Prior Publication Data

US 2016/0298770 A1    Oct. 13, 2016

(30) Foreign Application Priority Data

Apr. 7, 2015 (IT) .............................. TO2015A0203

(51) Int. Cl.
    *F16J 15/00*    (2006.01)
    *F16J 15/3232*  (2016.01)
    (Continued)

(52) U.S. Cl.
    CPC ......... *F16J 15/3232* (2013.01); *F16J 15/002* (2013.01); *F16J 15/3252* (2013.01); *F16J 15/3268* (2013.01); *F16J 15/3284* (2013.01)

(58) Field of Classification Search
    CPC .... F16J 15/002; F16J 15/3232; F16J 15/3252; F16J 15/3268
    (Continued)

(56) References Cited

U.S. PATENT DOCUMENTS

| 2,088,703 | A | * | 8/1937 | Hubbard | ................. | F16C 33/74 126/314 |
| 2,167,603 | A | * | 7/1939 | Victor | ..................... | F16C 33/74 277/562 |

(Continued)

FOREIGN PATENT DOCUMENTS

| DE | 2212969 | 4/1973 |
| DE | 20105450 | 7/2001 |

(Continued)

OTHER PUBLICATIONS

Corresponding Italian Search Report for IT TO20150203 dated Dec. 4, 2015. IT.

(Continued)

*Primary Examiner* — Nicholas L Foster
(74) *Attorney, Agent, or Firm* — The Belles Group, P.C.

(57) ABSTRACT

A gasket for sealing a compartment between a fixed and a roto-translatory member. The gasket has a metal support ring adapted to be connected to the fixed member; first sealing means in a position adjacent to a first ambient containing lubricant and defining two first annular sealing lips axially spaced to cooperate with the roto-translatory member and to counter the passage of lubricant/external contaminants between the first ambient and a second ambient connected with the outside; and second sealing means axially interposed between the first sealing means and the second ambient and defining a second sealing lip axially spaced from the first annular sealing lips and adapted to cooperate with the roto-translatory member to counter the passage of external contaminants towards the first sealing lips; the first sealing means comprise two first distinct sealing rings, axially arranged side by side and respectively carrying a relative first sealing lip.

11 Claims, 4 Drawing Sheets

(51) Int. Cl.
*F16J 15/3252* (2016.01)
*F16J 15/3268* (2016.01)
*F16J 15/3284* (2016.01)

(58) Field of Classification Search
USPC ........................................................ 277/568
See application file for complete search history.

(56) References Cited

U.S. PATENT DOCUMENTS

| | | | |
|---|---|---|---|
| 3,511,512 A | 5/1970 | Wheelock | |
| 4,359,228 A * | 11/1982 | Cather .................. | B63H 5/165 |
| | | | 277/309 |
| 5,421,591 A * | 6/1995 | Katzensteiner ...... | B60K 17/306 |
| | | | 277/550 |
| 2002/0153664 A1* | 10/2002 | Schroeder .............. | F16J 15/002 |
| | | | 277/551 |
| 2014/0062031 A1* | 3/2014 | Honzek ................. | B60C 23/003 |
| | | | 277/551 |
| 2016/0265665 A1* | 9/2016 | Desjardins ........... | F16J 15/3236 |

FOREIGN PATENT DOCUMENTS

| | | |
|---|---|---|
| EP | 1146265 | 10/2001 |
| JP | 2002013642 | 1/2002 |
| WO | 2012084412 | 6/2012 |

OTHER PUBLICATIONS

Corresponding European Office Action dated May 16, 2017.
Corresponding European Search Report for EP 16164339 dated Aug. 22, 2016.

* cited by examiner

GASKET

CROSS-REFERENCE TO RELATED APPLICATIONS

The present application claims priority under 35 U.S.C. § 119 to Italian Patent Application No. TO2015A000203, filed Apr. 7, 2015, the entirety of which is incorporated herein by reference.

FIELD OF THE INVENTION

The present invention relates to a sealing gasket for sealing a compartment between a movable member with a roto-translatory motion and a fixed member, so as to prevent the passage of lubricant from a first ambient to a second ambient, arranged on opposite sides of said compartment, and to hinder the passage of external contaminants from the second ambient to the first ambient.

BACKGROUND OF THE INVENTION

They are known gaskets of the above type, suitable to be used in working vehicles, such as tractors or earth-moving machines, under extremely severe operating conditions, characterized for example by:
intermittent operation of the motor, i.e. with continuous passages from a start condition to a stop condition and vice versa;
continuous back and forth movements of the vehicles, with angular movements in opposite directions of the rotating members on which the aforesaid gaskets are applied;
partial immersion of the vehicles in mud;
adverse weather conditions; and
relatively high circumferential speed of the rotating members on which the aforesaid gaskets are applied.

The gaskets of known type substantially comprise:
a support ring made of a metallic material, having a annular axial fixing portion, adapted to be connected in use to the fixed member;
a first ring of elastomeric material with a metallic inner core, radially more internal than the fixing portion of the support ring fixed to the fixing portion in a position adjacent to the first ambient and adapted to cooperate in use with the movable member to counter the passage of lubricant from the first ambient to the second ambient and the passage of external contaminants from the second ambient to the first ambient during the roto-translatory motion of the movable member;
a second sealing ring made of elastomeric material, carried by the support ring in a position adjacent to the second ambient and adapted to cooperate in use with the movable member to counter the passage of external contaminants from the second ambient to the first sealing ring; and
an annular wiper element, made of polyurethane or elastomeric material, axially interposed between the first and the second sealing ring and having an annular wiping lip adapted to cooperate in use with the movable member to counter the passage of external contaminants towards the first sealing ring.

The axial movement of the movable member in opposite directions requires the use, on the first sealing ring, of two barriers represented by two annular sealing lips, axially spaced from each other, in order to provide an adequate sealing against external contaminants. In fact, possible wear areas on the outer surface of the movable member, such as incisions, grooves, etc., might become a receptacle for external contaminants which might pass, with the axial movement of the movable member, into the first ambient if only a single barrier were provided on the first sealing ring.

In order to be effective, the two sealing lips of the first sealing ring must necessarily be arranged at an axial distance greater than the maximum axial displacement allowed to the movable member during operation. In this way, in fact, any wear area located upstream of the two sealing lips before the axial movement of the movable member towards the first ambient might not reach the first ambient.

The described solutions, although being functionally effective in many applications, do not allow a large spacing between the two sealing lips of the first sealing ring, especially in the case of gaskets having reduced radial sections. In these cases, in fact, the first sealing ring cannot overhangingly support two sealing lips if they are spaced beyond a certain axial distance.

SUMMARY OF THE INVENTION

The object of the present invention is a sealing gasket which simply and economically allows solving the aforesaid problem connected with the gaskets of known type.

Said object is achieved by the present invention in that it relates to a sealing gasket as defined in claim 1.

BRIEF DESCRIPTION OF THE DRAWINGS

For a better understanding of the present invention, two preferred embodiments are described in the following, purely by way of non-limiting examples and with reference to the accompanying drawings, in which.

DETAILED DESCRIPTION OF THE INVENTION

Figure 1:
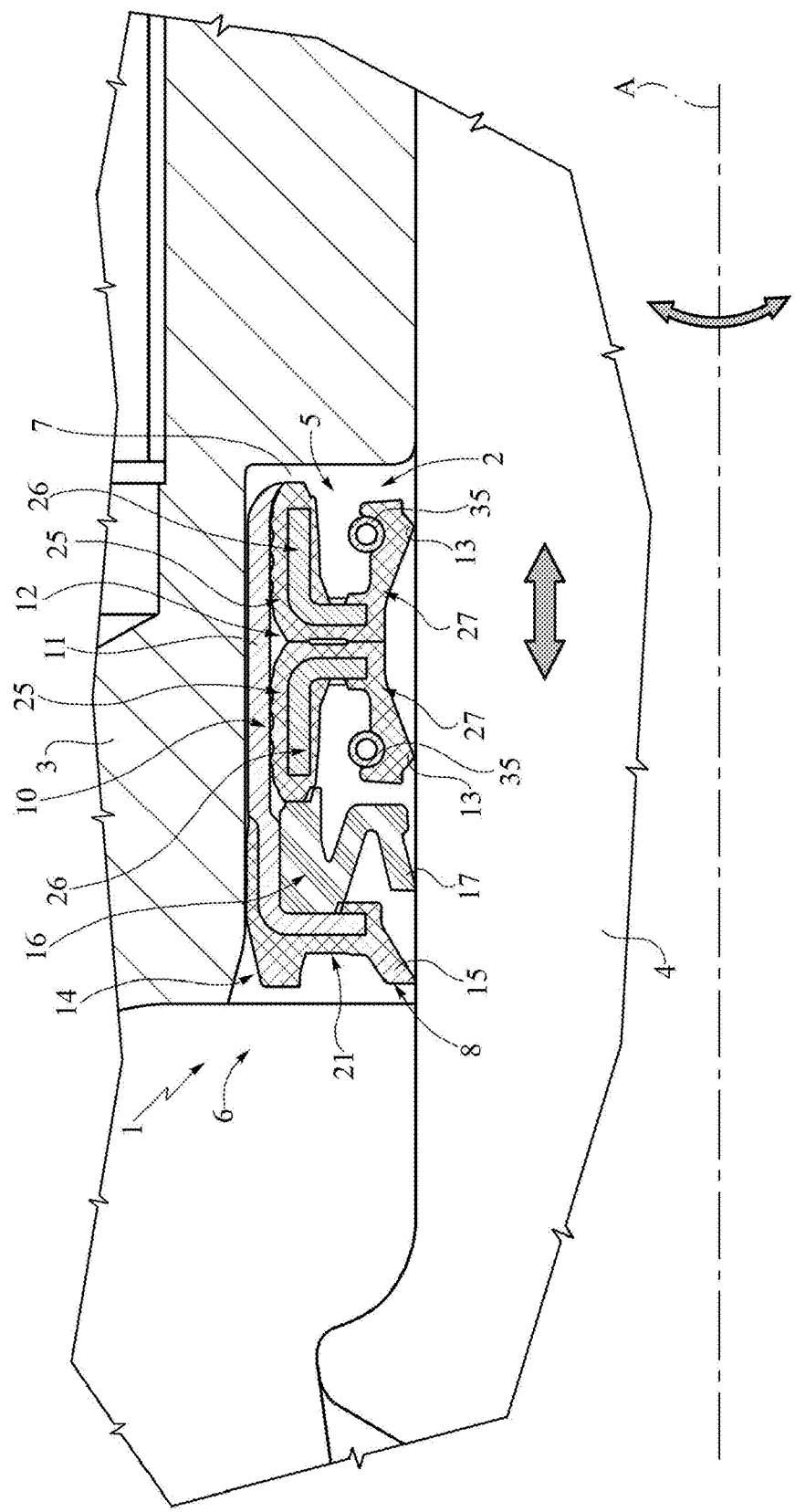
FIG. 1 is an axial half-section of a gasket according to the present invention, mounted in use between a fixed and a movable member to seal the space between them.

In FIG. 1, 1 indicates as a whole a self-supporting sealing gasket housed in the compartment 2 defined between an annular fixed member 3 having an axis A and a movable member 4, coaxially mounted within the fixed member 3 and with a roto-translatory motion with respect to the axis A, for example a shaft controlling the steering wheels of a vehicle.

In particular, the movable member 4 rotates in use around the axis A and further has a sliding motion along the axis A inside the fixed member 3.

The compartment 2 connects two ambients 5, 6 arranged on axially opposite sides of the gasket 1 with reference to the axis A; in the shown case, the ambient 5 (to the right in FIG. 1) contains lubricant, while the ambient 6 (to the left in FIG. 1) directly communicates with the outside.

The gasket 1 is adapted to seal the compartment 2 to prevent the passage of lubricant from the ambient 5 to the ambient 6 and hinder the passage of external contaminants from the ambient 6 to the ambient 5.

The gasket 1 has an annular configuration about the middle axis A and has a first and a second opposite axial end 7, 8 in use respectively facing the ambients 5 and 6.

Figure 2:
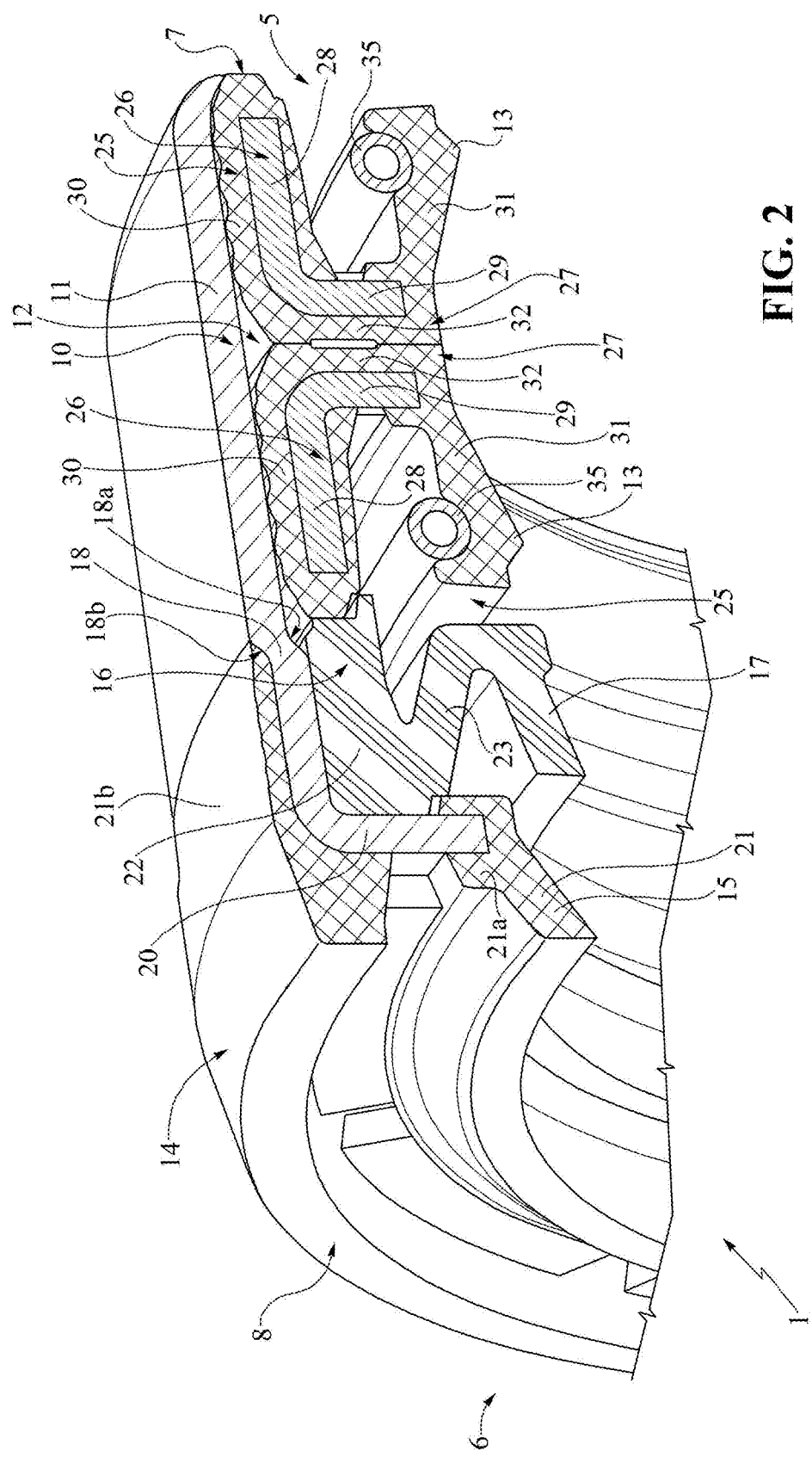
FIG. 2 is a perspective view, on an enlarged scale, of a portion of the gasket of FIG. 1.
Figure 3:
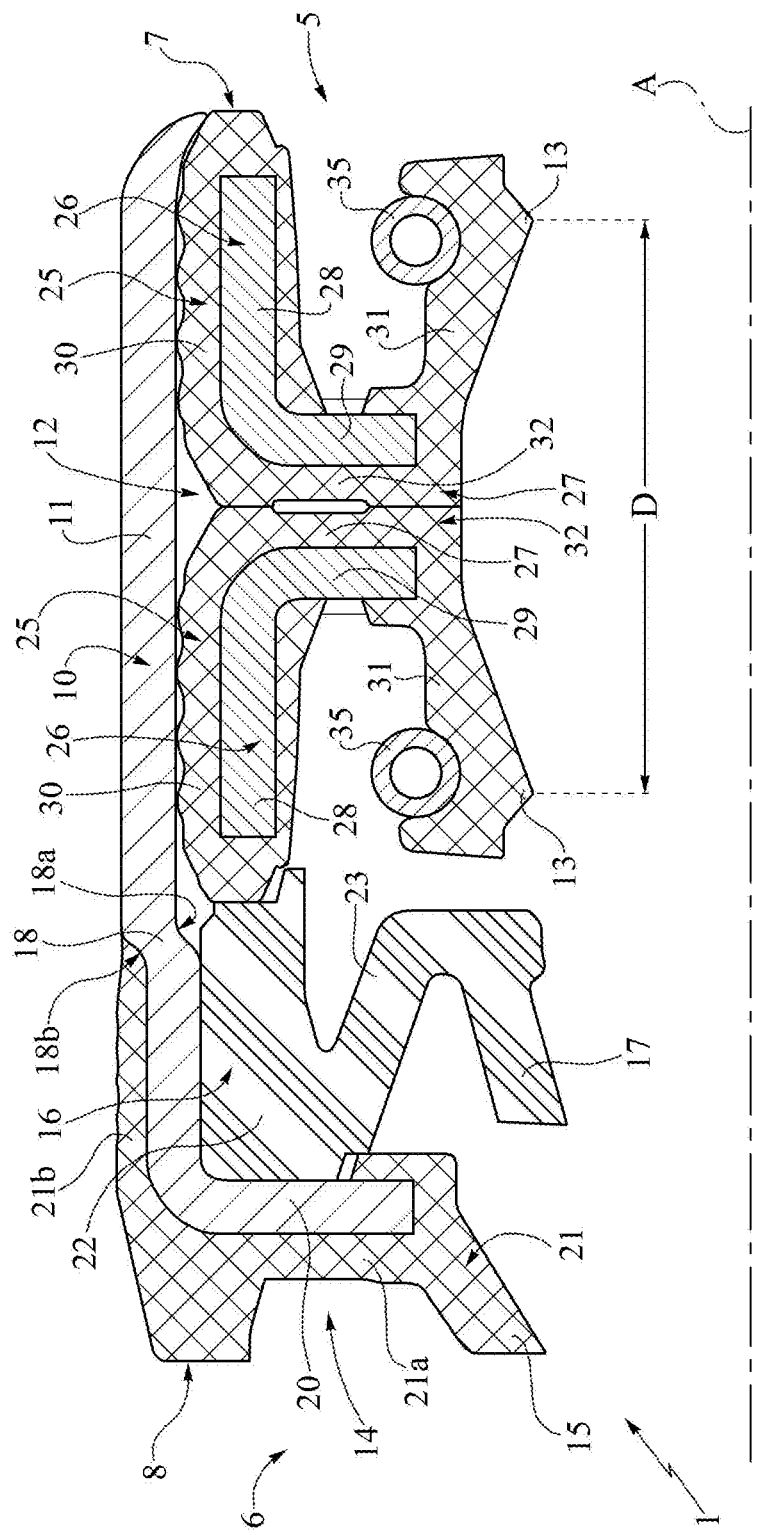
FIG. 3 is an axial half-section, on an enlarged scale, of the gasket of FIG. 1.

With reference to FIGS. 1 to 3, the gasket 1 comprises:
an outer support ring 10, in particular of rigid material, having an annular fixing portion 11 adapted to be connected in use to the fixed member 3 and extending between the axial ends 7 and 8;
first sealing means 12, internally carried by the fixing portion 11 of the support ring 10 in a position adjacent to the axial end 7 and defining two annular sealing lips 13 axially spaced from each other by a predefined distance D and adapted to cooperate in use with the movable member 4 to counter the passage of lubricant from the ambient 5 to the ambient 6 and hinder the passage of external contaminants from the ambient 6 to the ambient 5 during the roto-translatory motion of the movable member 4;
second sealing means 14, carried by the support ring 10 in an axially interposed position between the sealing means 12 and the axial end 8 and defining at least one annular sealing lip 15, axially spaced from the sealing lips 13 and adapted to cooperate in use with the movable member 4 to counter the passage of external contaminants from the ambient 6 to the inside of the compartment 2 and then to the ambient 5; and
an annular wiper element 16, preferably made of polyurethane or elastomeric material, axially interposed between the sealing means 12 and 14 and having an annular wiping lip 17, adapted to cooperate in use with the movable member 4 to counter the passage of external contaminants towards the sealing lips 13.

Preferably, the support ring 10 is made of metallic material; it is also possible that it is wholly or partially made of plastic material or includes plastic inserts.

In the example shown in FIGS. 1 to 3, the fixing portion 11 of the support ring 10 extends essentially parallel to the axis A, i.e. it has a mainly axial development.

In the present description and in the claims, the term "axial" is used to indicate portions which extend parallel to the axis A of the gasket 1, regardless of the fact that these portions may comprise shoulders or steps of reduced size, that do not substantially modify their axial development.

In the example shown, the fixing portion 11 of the support ring 10 has a rounded intermediate step 18 defining respective annular shoulders 18a, 18b facing the opposite axial ends 7, 8 of the gasket 1; the shoulder 18b is adapted to define an axial stop for the sealing means 14 as better explained in greater detail below.

The support ring 10 further comprises a radial annular portion 20 overhangingly extending towards decreasing diameters with respect to the axis A starting from one end of the fixing portion 11 adjacent to the axial end 8 of the gasket 1; the radial portion 20 is also connected to the fixing portion 11 by means of a curved section.

The sealing means 14 comprise an annular elastomeric element 21 having an essentially radial portion 21a, fitted on the radial portion 20 of the support ring 10, and an axial portion 21b covering a radially outer surface of the fixing portion 11, between the axial end 8 and the shoulder 21b; in this way, in use, the axial portion 21b of the elastomeric ring 21 is interposed between the fixing portion 11 of the support ring 10 and the fixed member 3, defining a static seal between them.

The sealing lip 15 overhangingly projects from a free end of the radial portion 21a of the elastomeric element 21, in use facing the movable member 4; the sealing lip 15 has a truncated-conical shape with a diameter decreasing towards the axial end 8 of the gasket 1.

In particular, in the shown case, said axial end 8 is defined by the sealing lip 15 and by a section of the radial portion 21a of the elastomeric element 21.

The wiper element 16 is axially sandwiched between the radial portion 20 of the support ring 10 and the sealing means 12.

In particular, the axial half-section of the wiper element 16 is approximately S-shaped and comprises in succession towards decreasing diameters with respect to the axis A:
an annular axial portion 22 arranged in contact with a radially inner surface of the fixing portion 11 of the support ring 10;
a truncated-conical intermediate portion 23, extending from one end of the axial portion 22 adjacent to the radial portion 20 of the support ring 10 and having a diameter decreasing towards the sealing means 12; and
the wiping lip 17 extending from the free end of the intermediate portion 23 towards the axial end 8 and having a truncated-conical shape with decreasing diameters towards the axial end 8.

As shown in FIGS. 1 to 3, the wiping lip 17 is axially interposed between the sealing lip 15 and the sealing lips 13.

The axial portion 22 of the wiper element 16 is sandwiched between the radial portion 20 of the support ring 10 and the sealing means 12.

Advantageously, the sealing means 12 comprise two distinct sealing rings 25, axially arranged side by side and respectively carrying a relative sealing lip 13.

In the example shown in FIGS. 1 to 3, the sealing rings 25 are axially contiguous.

The sealing rings 25 are the same and their axial half-section is respectively C-shaped.

The sealing rings 25 are advantageously arranged with their respective concavities facing opposite sides. In the example shown in FIGS. 1 to 3, the sealing ring 25 adjacent to the axial end 7 has the concavity turned towards this end, whereas the other sealing ring 25 has the concavity turned towards the wiper element 16 or, in an equivalent manner, towards the axial end 8.

Each sealing lip 13 is made at a free end portion of the respective sealing ring 25 opposite to the one which in use is close to the other sealing ring 25.

Each sealing ring 25 internally includes an annular stiffening element 26, preferably made of metal material, externally covered by an elastomeric element 27 which is annular too.

In particular, each stiffening element 26 comprises an axial portion 28, extending parallel and adjacent to the fixing portion 11 of the support ring 10, and a radial portion 29 overhangingly projecting from the axial portion 28 towards decreasing diameters with respect to the axis A.

More precisely, the radial portions 29 of the stiffening elements 26 are arranged side by side and parallel, whereas the axial portions 28 overhangingly extend from the ends having a greater diameter of the radial portions 29 towards the opposite axial ends 7, 8.

The radial portion 29 of each stiffening element is connected to the relative axial portion 28 by means of a curved section.

Each elastomeric element 27 comprises:
a first axial portion 30 fitted on the axial portion 28 of the respective stiffening element 26 and arranged in contact with the radially inner surface of the fixing portion 11 of the support ring 10;

a second axial portion 31 facing the axial portion 30 and provided with the relative sealing lip 13 on the opposite side to the one facing the axial portion 30; and a radial connection portion 32 between the axial portions 30 and 31, fitted on the radial portion 29 of the respective stiffening element 26.

The axial and radial portions 28, 29 of each stiffening element 26 are respectively inserted in the axial and radial portions 30, 32 of the respective elastomeric element 27.

The axial portion 31 of each elastomeric element 27 axially overhangingly projects from the minimum diameter radial end of the respective stiffening element 26 and is pressed, in use, into the movable member 4 by a relative annular spring 35.

Figure 4:
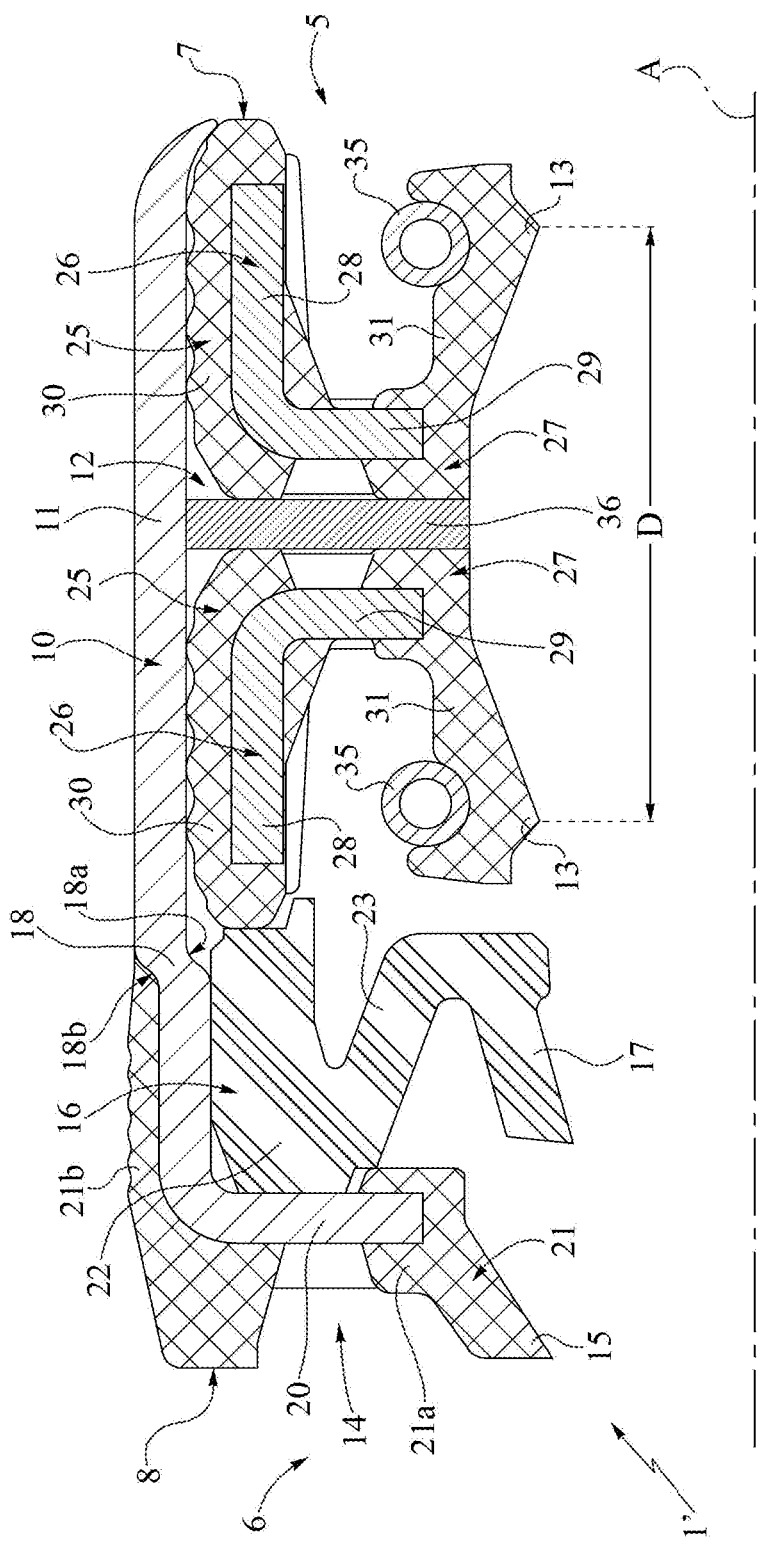
FIG. 4 is a half-section similar to FIG. 3 and showing a different embodiment of the gasket according to the present invention.

In FIG. 4, 1' indicates as a whole a different embodiment of a gasket according to the present invention, suitable to be housed in the compartment 2 to prevent the passage of lubricant from the ambient 5 to the ambient 6 and to counter the passage of external contaminants from the ambient 6 to the ambient 5; the gasket 1' is described hereinafter only insofar as it differs from the gasket 1, indicating with the same reference numbers parts identical or equivalent to parts already described.

In particular, the gasket 1' differs from the gasket 1 essentially because it comprises a spacer ring 36 axially interposed between the radial portions 32 of the elastomeric elements 27 of the sealing rings 25 and contacting the radial portions 32 at their opposite axial surfaces.

More precisely, the spacer ring 36 is defined by a flat annular disc of axis A.

By varying the thickness of the spacer ring 36 it is possible to adapt the distance D between the sealing lips 13 to the one required to prevent external contaminants from the ambient 6 from entering the ambient 5 as a result of the axial movement of the movable member 4.

The distance D between the sealing lips 13 is advantageously greater than the axial distance covered by the movable member 4 during each movement along the axis A and is independent from the radial thickness of the gasket 1, 1'. In this way, if the movable member 4 had, in its portion comprised between the sealing lip 13 closer to the axial end 8 and the axial end 8, any wear areas, such as small recesses or grooves where external contaminants could gather, these could never overcome the sealing lip 13 adjacent to the ambient 5 and contaminate the lubricant therein, thanks to the axial movement of the movable member 4 towards the axial end 7.

In use, any external contaminants from the ambient 6 should overcome in sequence the barriers represented by the lip 15 of the elastomeric element 21, by the wiping lip 17 of the wiper element 16 and by the sealing lips 13 before reaching the ambient 5.

This ensures a high number of working hours of the gaskets 1, 1' under severe conditions, namely on excavators or machines, usually operating for example on muddy terrain.

Thanks to the fact that the sealing lips 13 are integrally carried by distinct sealing rings 25, it is possible to achieve distances D greater than those allowed by the gaskets of known type, even in solutions having a reduced radial thickness.

Furthermore, the proposed solution allows using the same sealing ring 25 for sealing both the ambient 5 (lubricant) and the ambient 6 (external contaminants), with savings in terms of number of components to manufacture and keep in stock.

Moreover, the possibility to insert a spacer ring between the sealing rings 25, as in the case of the gasket 1', allows covering any distance D, regardless of the radial thickness of the used gasket.

Finally, it is clear that the gaskets 1, 1' here described and shown can be subject to modifications and variations without departing from the scope of protection defined by the appended claims.

What is claimed is:

1. A self-supporting gasket (1, 1') for sealing a compartment (2) between a fixed member (3) and a movable member (4), provided with roto-translatory motion with respect to a middle axis (A), so as to prevent the passage of lubricant from a first ambient environment (5) to a second ambient environment (6) arranged on opposite axial sides of said compartment (2), and to at least hinder the passage of external contaminants from said second ambient environment (6) to said first ambient environment (5);

said gasket (1, 1') having an annular configuration about said middle axis (A) and having opposite first and second axial ends (7, 8), adapted to be arranged, in use, facing said first and second ambient environments (5, 6), respectively;

said gasket (1, 1') comprising:
a support ring (10), made of rigid material, having an annular fixing portion (11) adapted to be connected, in use, to said fixed member (3) and extending between said first and second axial ends (7, 8);
a first sealing arrangement (12) radially more internal than said fixing portion (11) of said support ring (10), carried by the fixing portion (11) in a position adjacent to said first axial end (7) and defining two first annular sealing lips (13) axially spaced from each another by a predetermined distance (D) and adapted to cooperate, in use, with said movable member (4) to counter the passage of lubricant from said first ambient environment (5) to said second ambient environment (6) and of external contaminants from said second ambient environment (6) to said first ambient environment (5) during the roto-translatory motion of the movable member (4) with respect to said middle axis (A);
a second sealing arrangement (14) carried by said support ring (10) in a position axially interposed between said first sealing arrangement (12) and said second axial end (8) and defining at least a second annular sealing lip (15) axially spaced from said first annular sealing lips (13) and adapted to cooperate, in use, with said movable member (4) to counter the passage of external contaminants towards said first annular sealing lips (13) during the roto-translatory motion of the movable member (4) with respect to said middle axis (A);

characterized in that said first sealing arrangement (12) comprises two first distinct sealing rings (25), axially arranged side by side and each respectively comprising integrally one of the first annular sealing lips (13); wherein each of two first distinct first sealing rings (25) are respectively C-shaped; and wherein said first sealing rings (25) each have respective concavities facing opposite sides.

2. The gasket according to claim 1, wherein said first sealing rings (25) each have an identical shape.

3. The gasket according to claim 1, wherein each first annular sealing lip (13) is respectively formed at a free end portion of one of said first sealing rings (25).

4. The gasket according to claim 1, wherein said first sealing rings (25) are axially contiguous.

5. The gasket according to claim 1, further comprising a spacer ring (36) axially interposed between said first sealing rings (25) and contacting the first sealing rings (25) at opposite axial surfaces.

6. The gasket according to claim 1, wherein each said first sealing ring (25) internally comprises an annular stiffening element (26) externally covered at least partially by an elastomeric element (27) and having an annular shape.

7. The gasket according to claim 6, wherein the elastomeric element (27) of each first sealing ring (25) comprises a first axial portion (30) arranged in contact with said fixing portion (11) of said support ring (10), a second axial portion (31) substantially parallel to and facing the first axial portion (30) and each respectively provided with one of said first annular sealing lips (13), and a radial connection portion (32) between said first and second axial portions (30, 31).

8. The gasket according to claim 7, wherein the stiffening element (26) of each first sealing ring (25) comprises an axial portion (28), inserted in said first axial portion (30) of said elastomeric element (27), and a radial portion (29) inserted in said radial connection portion (32) of said elastomeric element (27); and wherein said second axial portion (31) of said elastomeric element (27) axially projects from an inner diameter radial end of said stiffening element (26).

9. The gasket according to claim 1, wherein said fixing portion (11) essentially extends in parallel with respect to said middle axis (A).

10. The gasket according to claim 1, further comprising an annular wiper element (16) axially interposed between said first and second sealing arrangement (12, 14) and having an annular wiping lip (17) adapted to cooperate, in use, with said movable member (4) to counter the passage of external contaminants towards said first annular sealing lips (13).

11. The gasket according to claim 10, wherein said support ring (10) comprises a radial portion (20) adjacent to said second axial end (8) and extending radially inward from said fixing portion (11) with respect to said middle axis (A); wherein said second sealing arrangement (14) comprises a first and a second annular elastomeric element (21) fitted on said radial portion (20) of said support ring (10); and wherein said wiper element (16) is axially sandwiched between said radial portion (20) of said support ring (10) and said first sealing arrangement (12).

\* \* \* \* \*